(12) United States Patent
Carson (10) Patent No.: US 8,259,549 B2
(45) Date of Patent: Sep. 4, 2012

(54) DEFLECTION REFERENCE ADJUSTMENT FOR VARIABLE TRACK PITCH MEDIA

(75) Inventor: Douglas M. Carson, Cushing, OK (US)

(73) Assignee: Doug Carson & Associates, Inc., Cushing, OK (US)

(*) Notice: Subject to any disclaimer, the term of this patent is extended or adjusted under 35 U.S.C. 154(b) by 266 days.

(21) Appl. No.: 12/850,417

(22) Filed: Aug. 4, 2010

(65) Prior Publication Data

US 2011/0032633 A1 Feb. 10, 2011

Related U.S. Application Data

(60) Provisional application No. 61/231,195, filed on Aug. 4, 2009.

(51) Int. Cl.
G11B 5/09 (2006.01)

(52) U.S. Cl. .......... 369/59.2; 360/55; 341/144; 341/118

(58) Field of Classification Search .................. 369/116, 369/43, 30.17, 59.2, 59.15; 360/77.04, 78.04, 360/55; 341/14, 155, 118, 136, 144
See application file for complete search history.

(56) References Cited

U.S. PATENT DOCUMENTS

| | | | |
|---|---|---|---|
| 4,272,760 A | 6/1981 | Prazak et al. | |
| 4,484,203 A * | 11/1984 | Booth et al. | 347/229 |
| 4,486,870 A | 12/1984 | Pettigrew et al. | |
| 4,866,687 A | 9/1989 | Kasai et al. | |
| 5,033,039 A | 7/1991 | Richgels | |
| 5,878,015 A | 3/1999 | Schell et al. | |
| 6,414,616 B1 | 7/2002 | Dempsey | |
| 6,556,154 B1 | 4/2003 | Gorecki et al. | |
| 7,140,814 B2 | 11/2006 | Singh et al. | |
| 7,209,055 B1 * | 4/2007 | Stovall et al. | 341/14 |
| 7,592,868 B2 | 9/2009 | Hasegawa | |

* cited by examiner

Primary Examiner — Ali Neyzari
(74) Attorney, Agent, or Firm — Hall Estill Attorneys at Law (57) ABSTRACT

Apparatus and method for generating an analog waveform, such as a deflection signal used to deflect a write beam during the writing of data to a rotatable medium having a variable track pitch (TP). In accordance with various embodiments, a first digital to analog converter (DAC) is configured to output a deflection signal having an analog voltage level corresponding to a magnitude of a first multi-bit digital input value applied to the first DAC. A second DAC is configured to supply a rail voltage to the first DAC having an analog voltage level corresponding to a magnitude of a second multi-bit digital input value applied to the second DAC. The deflection signal is used to deflect a write beam supplied by a write beam generator.

20 Claims, 6 Drawing Sheets

DEFLECTION REFERENCE ADJUSTMENT FOR VARIABLE TRACK PITCH MEDIA

RELATED APPLICATION

The present application makes a claim of domestic priority under 35 U.S.C. §119(e) to U.S. Provisional Patent Application No. 61/231,195 filed Aug. 4, 2009, the contents of which are hereby incorporated by reference.

BACKGROUND

Data storage media are used to store and retrieve large amounts of digitally encoded data in a fast and efficient manner. Such media have been commercially provided in a number of different forms, such as magnetic, optical, solid-state (e.g., flash memory), etc.

Some media, such as magnetic and optical discs, can be rotated at a selected velocity while a head assembly transduces a read back signal to recover a data pattern stored to a media surface. The data patterns are often arranged on such media along a series of concentric tracks (e.g., discrete rings, a continuous spiral, etc.). An actuator, under the control of a closed loop servo circuit, can be used to position the head assembly adjacent the tracks in order to recover the data patterns.

Actuators can be rotary in nature so as to pivot about a pivot point adjacent an outermost diameter (OD) of a medium. In this way, the head assembly follows a curvilinear translation path across the radius of the medium. By contrast, linear actuators advance and retract the head assembly along a linear translation path across the radius of the medium.

In some cases, data patterns can be pre-written to a medium during manufacture to provide servo or other types of control information. The pre-written patterns may be written using an actuator with a different translation path geometry than that of a reader system used to subsequently access the medium. In such cases, the pre-written data may not conform to the finally utilized translation geometry of the reader system. This may lead to offsets (e.g., relative differences in angular position of the head assembly with respect to the data) as the head moves from one track to the next.

SUMMARY

Various embodiments of the present invention are generally directed to an apparatus and method for generating an analog waveform, such as a deflection signal used during the writing of tracks of data to a rotatable storage medium having a variable track pitch (TP).

In accordance with various embodiments, a first digital to analog converter (DAC) is configured to output a deflection signal having an analog voltage level corresponding to a magnitude of a first multi-bit digital input value applied to the first DAC. A second DAC is configured to supply a rail voltage to the first DAC having an analog voltage level corresponding to a magnitude of a second multi-bit digital input value applied to the second DAC. The deflection signal is used to deflect a write beam supplied by a write beam generator.

Other features and advantages of the various embodiments of the present invention can be understood from a review of the following detailed description in conjunction with the associated drawings.

DETAILED DESCRIPTION

The present disclosure generally relates to the generation of analog waveforms in a control system, such as deflection signals used to write data to a recording medium.

Figure 1A:
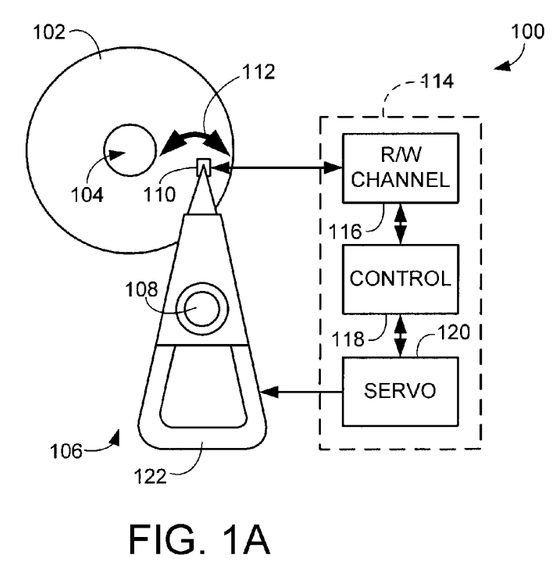
FIG. 1A provides an exemplary reader system for reading a rotatable medium using a rotary actuator.

FIG. 1A schematically depicts a reader system 100. The reader system includes a storage medium 102, such as a magnetic storage disc or an optical storage disc. The medium 102 is rotated by a motor 104 at a selected velocity. In some embodiments, the motor 104 rotates the medium 102 at a constant velocity (constant angular velocity, or CAV), although other rotation profiles such as constant linear velocity (CLV) can be alternatively employed.

A rotary actuator 106 is positioned adjacent an outermost diameter (OD) of the medium 102. The actuator 106 pivots about a pivot shaft 108, thereby moving a head assembly 110 along a curvilinear translation path as generally denoted at 112. It is contemplated that the head assembly 110 can carry out both read and write operations with the medium 102, although such is not necessarily required.

Reader system electronics are generally denoted at 114. These system electronics include a read/write (R/W) channel 116, a controller 118, and a servo circuit 120. The read/write channel 116 handles data exchanges with the head assembly 110 to transfer data between the medium 102 and a host device (not shown).

The controller 118 provides top level control of the system 100. The servo circuit 120 provides a closed-loop servo control operation to position the head assembly 110 adjacent various tracks (not shown) defined on the medium surface. In some embodiments, the servo circuit 120 applies controlled current to a coil 122 of a voice coil motor (VCM, not fully shown) to pivot the actuator 106 about the pivot shaft 108.

For reference, X and Y axial directions are defined with respect to the medium. The X direction corresponds to a radial direction across the medium 102, from a center axis to the OD. The Y direction corresponds to a tangential direction along each track on the medium 102. It will be noted that the curvilinear translation path 112 has both X and Y components.

Figure 1B:
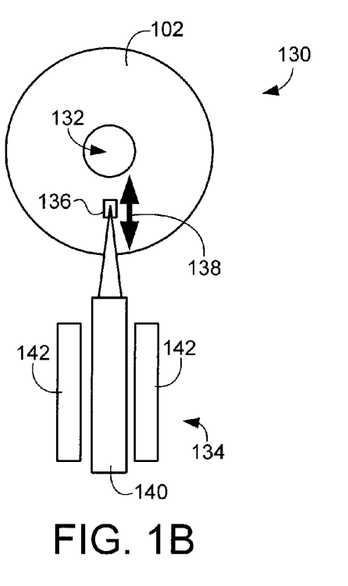
FIG. 1B provides an exemplary writer system for writing data to the rotatable medium of FIG. 1A using a linear actuator.

FIG. 1B provides a schematic representation of portions of a writer system 130. The writer system 130 is configured to pre-write data patterns to the medium 102 of FIG. 1A. While not limiting, it is contemplated that in some embodiments the pre-written data patterns can include embedded servo data used by the servo circuit 120 during seeking and track following operations of the reader system 100. In some embodiments, the medium written by the writer system 130 is a master disc from which a population of replicated discs are produced, such as via a printing operation.

The writer system 130 includes a motor 132 which rotates the medium 102 at a selected velocity. This velocity may or may not match that of the velocity imparted by the motor 104 of the reader system 100 in FIG. 1A. The motor 132 in FIG. 2 may rotate the medium 102 using a constant linear velocity (CLV), or some other profile.

A linear actuator 134 is provided adjacent the medium 102, and is used to advance and retract a write head assembly 136 along a linear translation path 138 across the radius of the medium 102. Such lateral movement can be achieved by the selective application of current to a coil 140, which interacts with a magnetic field provided by permanent magnets 142. It will be noted that the linear translation path 138 is aligned along the X direction and has substantially no Y component.

Figure 2:
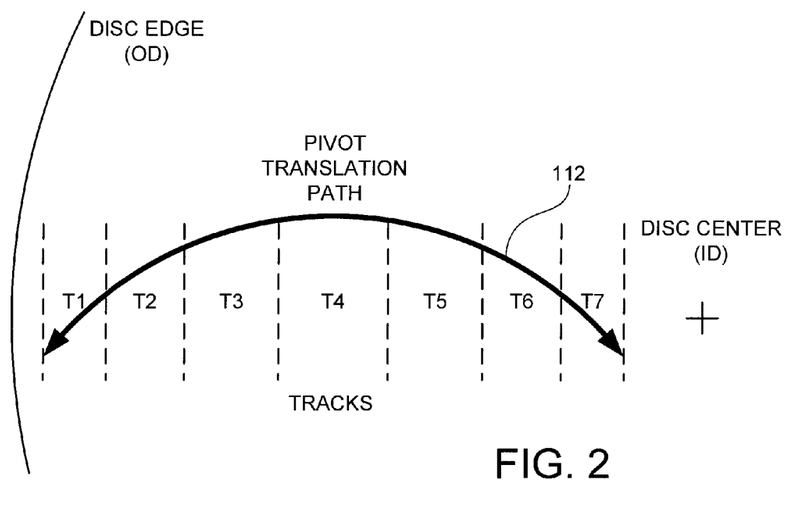
FIG. 2 generally depicts an exaggerated pivot translation geometry across the rotatable medium of FIGS. 1A-1B.

FIG. 2 generally illustrates the use of variable track pitch by the writer system 130 of FIG. 1B to accommodate the pivot translation characteristics of the reader system 100 of FIG. 1A. FIG. 2 is a simplified diagram with highly exaggerated differences in track pitch (TP), or width, for seven exemplary tracks T1-T7. It will be appreciated that an actual commercial embodiment may involve the writing of several tens of thousands or more tracks across the radial extent of the medium, not just the seven shown in FIG. 2, and the variation in TP from track-to-track may be significantly less than that set forth in the figure.

Nevertheless, it can be seen that tracks near the innermost and outermost diameters (ID and OD) of the disc 102 such as tracks TP1 and TP7 may be significantly narrower, or have a lower TP, than tracks near the medial portion of the disc such as track TP4. As noted above, this variation in TP will compensate for the geometry of the rotational actuator (pivot translation) path 112 of FIG. 1A.

Figure 3:
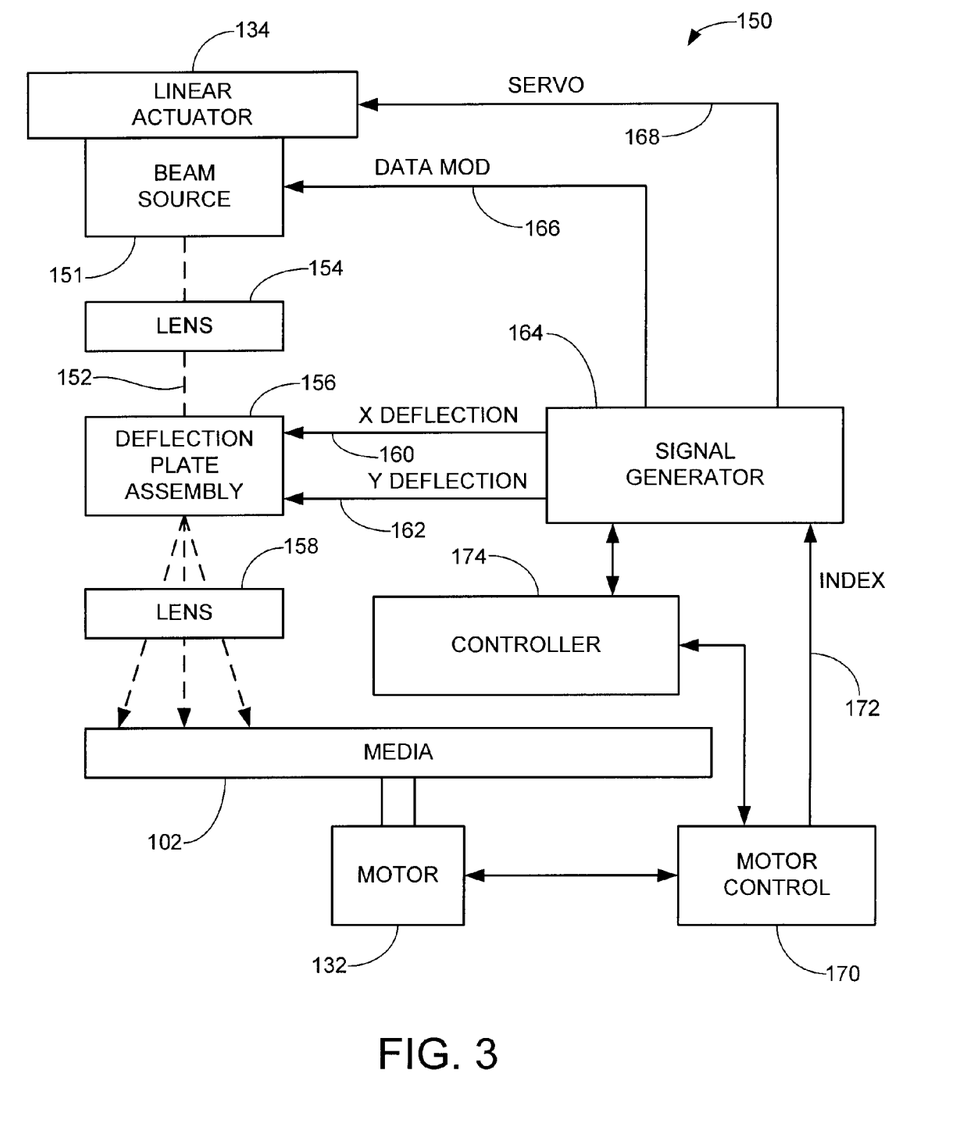
FIG. 3 is a functional block representation of an electron beam recorder (EBR) operated in accordance with some embodiments of the present invention.

Referring now to FIG. 3, in some embodiments the write head assembly 136 of FIG. 1B is characterized as a head assembly of an electron beam recorder (EBR) 150. As will be recognized by those skilled in the art, an EBR operates to generate a write beam comprising a stream of electrons. The write beam impinges the associated medium to write a pattern thereto. The interaction of the beam with the medium may be magnetic, chemical, dye reactive, etc. Other types of write beams are contemplated, so the EBR 150 in FIG. 3 is merely illustrative and not limiting.

A write beam generator 151 generates the write beam (denoted by broken line 152). The write beam 152 is passed through an upper lens assembly 154, adjacent a deflection plate assembly 156, and through a lower lens assembly 158 to impinge upon the medium 102. The deflection plate assembly 156 imparts controlled deflection of the beam 152 along the respective X and Y directions, as required.

The deflection plate assembly 156 can be arranged as respective pairs of parallel plates disposed on opposing sides of the beam path. The application of controlled voltage signals, as indicated by the X deflection and Y deflection signals on paths 160 and 162, impart a controlled displacement of the axial path of the write beam 156. Although not shown, a closed loop detection mechanism can be employed to ensure the desired amount of beam deflection is obtained in response to a given desired input.

The X and Y deflection signals are generated by a signal generator block 164. The block 164 also generates a data modulation signal which is provided on path 166 to the beam source 151 to modulate (turn on/off) the write beam 152. The signal generator 164 further provides servo control signals on path 168 to the linear actuator 134 to advance the head assembly 136 across the medium along path 138 (see FIG. 2).

Control of the motor 134 is provided by a motor control circuit 170. In some embodiments, the motor control circuit 170 can provide a once-per-revolution index signal to the signal generator, as indicated by path 172. A controller 174 provides top level control of the EBR 150.

Figure 4:
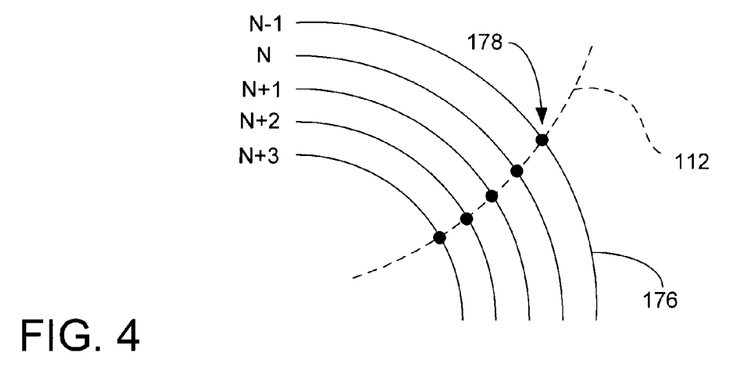
FIG. 4 depicts a pivot translation geometry as it intersects a number of concentric tracks on a rotatable medium.

FIG. 4 is an exaggerated view of a number of adjacent tracks 176 on the medium 102. The tracks are arbitrarily denoted as N−1 to N+3. A portion of the curvilinear translation path 112 of the reader system actuator 106 (see FIG. 1) is also shown in exaggerated form in FIG. 4. A series of points 178 are shown for each track, corresponding to the intersection points along each of the tracks N−1 to N+3 over which the reader head assembly 110 (FIG. 1) will pass when the medium is at a selected angular location.

In some embodiments the tracks are written using zone based recording (ZBR) techniques, also referred to as zoned constant angular velocity (ZCAV) recording. Using ZCAV means that each of the tracks N−1 to N+3 has exactly the same number of channel bits recorded thereto. This will provide each of the tracks in a given zone with the same number of data sectors, allowing the read/write channel to select and maintain a given read/write frequency for data exchanges with tracks in the given zone.

Each of the tracks can be written in steps over one or, more typically, multiple revolutions, such as 100 revolutions of the medium for each track. It would be possible to operate the EBR 150 of FIG. 3 to hold the write head assembly 136 still at a fixed radius for each of these revolutions, and then advance the write head assembly 136 in a step-wise fashion prior to commencing the writing of the data for the next revolution. However, this may undesirably increase latency time during the recording process since the head may need to wait substantially an entire rotation before writing that next step. Initiating and stopping movement of the head assembly in a step-wise fashion can also undesirably excite mechanical resonances that need to be damped prior to the writing of each new set of data.

Accordingly, the EBR 150 of FIG. 3 is preferably operated such that the head assembly 136 continuously moves across the radius of the disc 102, and the X and/or Y deflection signals on paths 160, 162 are used to maintain the beam impingement at a constant radius (or other desired location).

Figure 5:
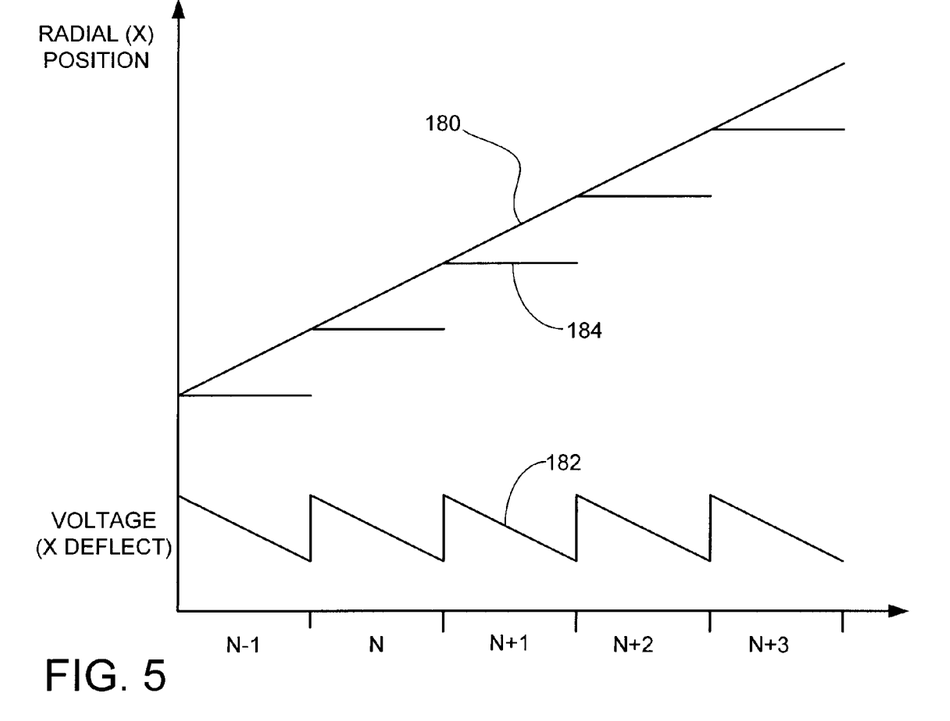
FIG. 5 graphically represents an analog voltage control signal used to provide deflection of a write beam along a selected axial direction.

Exemplary X deflection profiling of the write beam is depicted in FIG. 5, which shows an X direction write head translation curve at 180. The curve 180 is substantially linear, indicative of a constant velocity being imparted to the write head assembly 136 (e.g., beam source 151, lens assemblies 154, 158 and deflection plate assemblies 156) during the pre-write operation. As noted above, because of the mass and associated inertia of the head assembly, moving the entire assembly along a continuous profile such as at a constant velocity advantageously reduces the excitation of resonances which might affect the ultimate impingement location of the beam 152 onto the medium 102.

Constant movement of the write head assembly further increases the efficiency of the write operation. The use of stepwise, incremental advances of the head assembly might undesirably lengthen the pre-write operation. This is due to the requisite time to advance and settle the head assembly at each new radius, as well as the rotational latency delay required for the appropriate angular location of the medium to rotate around to the head assembly.

While a linear radial velocity is shown by 180, other profiles can alternatively be used. While not shown in FIG. 3, a closed loop detection and control system, such as a laser inferometer, can be used to ensure precise movement of the actuator along the profile 180.

As the head assembly 136 is continually swept across the medium 102 (in this case, from the OD to the ID), a generally saw-tooth voltage profile 182 is applied with transitions coincident with each rotation (in this case, each track boundary). The profile 182 in FIG. 5 corresponds to the X deflection signal on path 160 in FIG. 3. It will be appreciated that the relative change and polarity of the voltage profile 182 will be adapted for a given application.

The voltage profile 182 will generally cause the write beam 152 to stay "on-track" as the write head assembly 136 continues to move in the selected radial (X axial) direction. This results in the sequential writing of data patterns to each track, as represented at 184. At the conclusion of the writing of the last bit of a given track, the write beam "snaps" back in sufficient time to write the first bit for the next track. Y directional deflection control can be carried out in similar fashion to provide controlled, stepwise deflection of the write beam along the Y direction (e.g., in the direction along each track).

Saw-tooth deflection signals such as 182 in FIG. 5 can be generated using a digital to analog converter (DAC). As will be appreciated by those having skill in the art, DACs generally operate to convert a multi-bit digital input value into a corresponding analog output voltage. The output analog voltage has an analog magnitude that corresponds to the magnitude of the input digital value.

The output voltage range of a DAC is often established in relation to a pair of reference voltages VREF+ and VREF−. By way of providing a simple example, a 4-bit DAC with reference voltages of +1.0V and 0.0V can provide $2^4=16$ different increments in output analog voltage between 0 and 1 volt. For example, an input value of 0000 ($0_{10}$) would generally result in an output analog voltage of 0.0V; an input value of 1111 ($15_{10}$) would generally provide an output analog voltage of 1.0V; an intermediary value such as 0111 ($7_{10}$) would generally provide an output voltage of 0.5V, and so on.

DACs can be provided with a variety of input bit capacities; for example, 10-bit, 12-bit and 16-bit DACs are commonly employed in a number of different applications. Generally, the higher the bit capacity, the greater the resolution in the output voltage range. For example, a 16-bit DAC would generally tend provide a greater number of available output analog voltage levels (steps) as compared to a 10-bit DAC; the 16-bit DAC would allow up to 65,536 ($2^{16}$) steps responsive to the magnitude of the 16-bit input digital word, whereas the 10-bit DAC would only allow up to 1024 ($2^{10}$) steps responsive to the magnitude of the 10-bit input digital word.

DACs can further be provided with a variety of maximum reference (rail) voltage ranges, such as 1V, 2V, 5V, 12V, etc. That is, the total number of available output steps from a DAC will depend on the number of input bits, but the actual overall range of the output analog signal will depend on the reference voltages supplied to the DAC. Thus, a 16-bit DAC can supply 65,536 steps over a voltage range of from 0V to 1V, from −3V to +3V, etc. It will be appreciated that the actual magnitude of each output step will depend on the overall reference voltage range.

There are a variety of DAC constructions known in the art, such as disclosed by U.S. Pat. No. 6,414,616. Some DAC configurations utilize a switched resistive ladder network to operate as a selectable voltage divider circuit to output the desired analog value. The actual internal configuration of the DAC can vary, so that the present disclosure is not limited to a particular DAC configuration.

Figure 6:
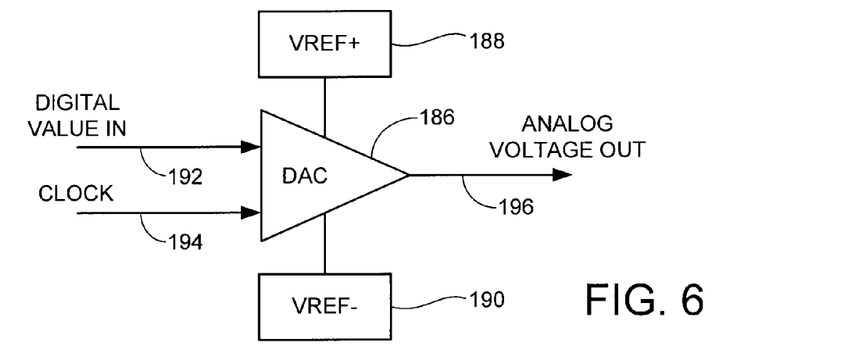
FIG. 6 shows a digital to analog converter (DAC) that can be configured to generate the analog voltage control signal of FIG. 5.

An exemplary DAC circuit is illustrated at 186 in FIG. 6. For purposes of the present discussion, it is contemplated that the DAC 186 is a 10-bit DAC with 1024 ($2^{10}$) output steps and a maximum voltage range of 1.0V. Respective reference voltage sources 188, 190 provide VREF+ and VREF− rail voltages to the DAC 186 over the range from VREF− to VREF+. It will be contemplated for purposes of discussion that VREF+ is nominally +1.0V and VREF− is nominally 0V, although other relative values could be used.

Multi-bit digital input values are supplied via path 192, and as desired a sample clock signal can be provided via path 194. Generally, the DAC 186 operates at each clock transition to output an analog voltage on output path 196 over the range from VREF+ to VREF− that corresponds to the magnitude of the multi-bit input sample value supplied on path 192.

Figure 7A:
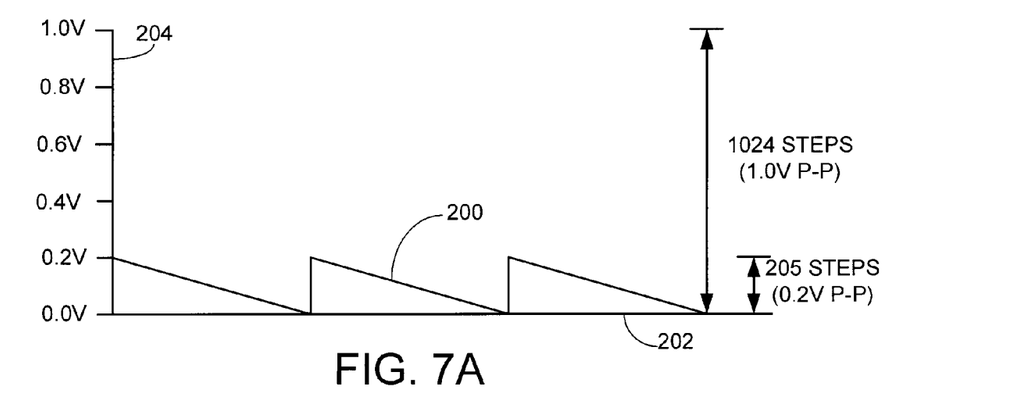
FIGS. 7A and 7B are analog voltage control signals expressed over different voltage ranges.

FIG. 7A shows a graphical representation of a first sawtooth curve 200 generated by the DAC 186 of FIG. 6. The curve 200 is plotted against an elapsed time x-axis 202 and a reference voltage range 204. The curve 200 represents an X-deflection signal such as illustrated at 182 in FIG. 5, although other applications and shapes of curves can be used. The signal is generated by successively providing digital sample values to the DAC 186 (via path 192, FIG. 6) that decrease in value linearly as shown over each of the three illustrated cycles. The digital sample values are supplied to provide the output analog curve 200 over a range of from 0V to 0.2V. This range represents the amount of deflection required during the operation of the system.

It will be noted that only the lowest 20% of the DAC output range is employed in FIG. 7A; that is, the curve 200 will only have 1024/5 or about 205 steps of resolution. Even if the DAC is clocked 1024 times per cycle, a new output value will generally only be updated once every five clocks. This is because only 205 increments are available between the operative range of 0-0.2V.

Figure 7B:
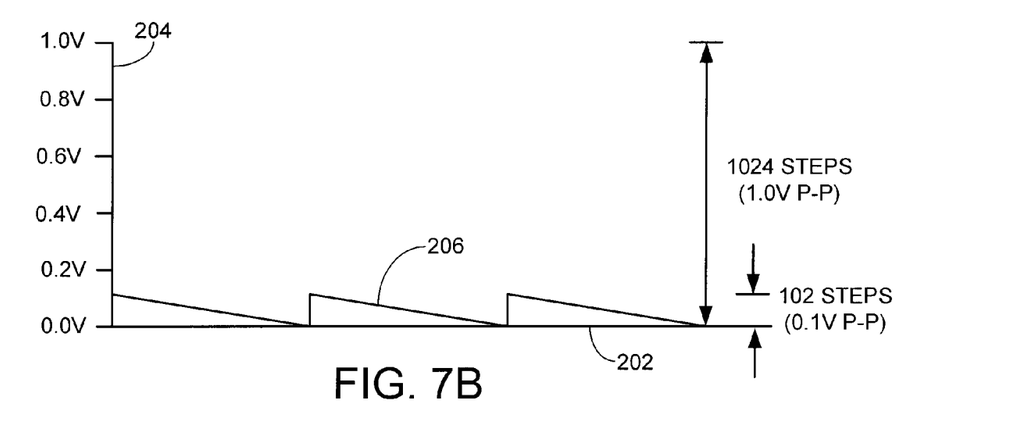

FIG. 7B shows further operation of the DAC 186 of FIG. 6, this time providing a second sawtooth curve 206 with an operational range of from 0V to 0.1V. The curve 206 only utilizes 10% of the overall DAC output range, resulting in 1024/10 or about 102 steps of resolution being available to provide the desired analog output. Thus, even if the DAC 186 is clocked 1024 times per cycle, the output value can only be updated once every 10 cycles since only 102 different values are available for the output analog signal.

Reductions in DAC operational ranges such as illustrated by FIGS. 7A-7B can lead to difficulties in achieving precise mastering of media. Consider a particular medium that to be mastered by the EBR 150 of FIG. 3 with variable track pitch such as generally illustrated in FIG. 2. The track pitch will vary in relation to radius. If deflection signals are applied to the write head assembly 136 (FIG. 3) of the EBR to accommodate constant movement of the head assembly, then the saw tooth radial deflection signal will generally change in amplitude in direct relation to changes in mechanical track pitch.

It follows that the voltage step sizes for each rotation will also change on a per-rotation (or per track) basis, as will the utilized sampling range (i.e., number of analog steps in the output signal) of the DAC. For example, for a fixed 1.0V DAC range, an EBR with a 2 µm/V response (i.e., $2 \times 10^{-6}$ m of mechanical deflection for each 1V of input deflection signal), and a track pitch TP of 1 μm, there would be 205 available steps for the deflection signal over each rotation, such as illustrated by the curve 200 in FIG. 7A. In this case, the curve 200 would be applied for each incremental step of the selected track (with the TP=1 μm), and each cycle in FIG. 7A would correspond to a complete rotation of the medium.

Assume that at the completion of the selected track, a second (next adjacent) track is written to the medium with a TP that is 1% less than the first track. This will require a reduction in the overall voltage range by about 1%, which in turn may reduce the number of available DAC steps to about 202 steps. If the TP were to continue to decrease by 1% per track for the next 50 rotations, it can be seen that the 50$^{th}$ track may be reduced to only about 102 DAC steps, such as shown for the curve 206 in FIG. 7B. While at a macro level the sawtooth deflection signal in each case will have the proper frequency and range, at a micro level there may be significant amounts of electrical noise in the deflection signal, resulting in radial errors in the placement of the written data along the tracks.

Figure 8:
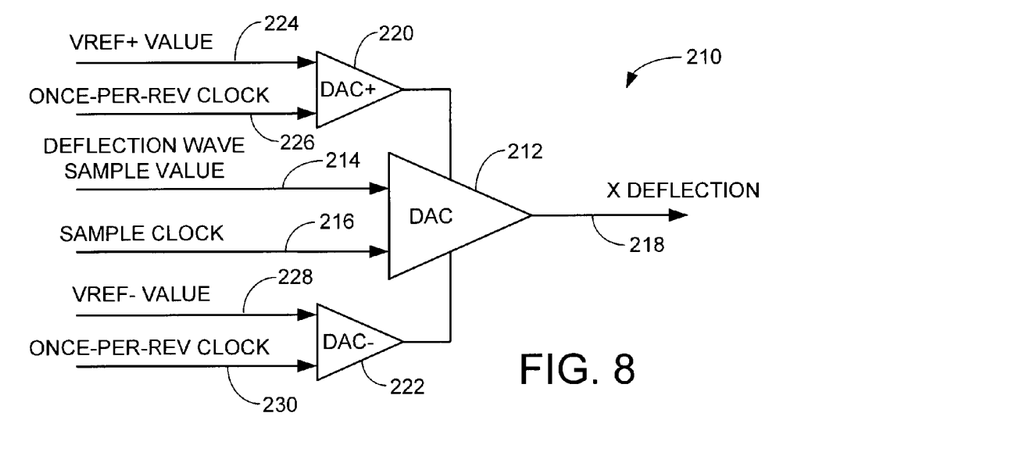
FIG. 8 shows a control circuit with primary and secondary DACs operated in accordance with some embodiments to address the differences in the voltage ranges of FIGS. 7A-7B.

Accordingly, various embodiments of the present invention generally operate to address these and other limitations of DAC resolution for small operational ranges. FIG. 8 shows a DAC assembly 210 with a main (primary) DAC 212. The main DAC 212 may be nominally identical to the DAC 186 in FIG. 6. As with the DAC 186 in FIG. 6, the main DAC 212 in FIG. 8 is configured to receive multi-bit digital values (deflection wave sample values) on path 214 and a sample clock signal on path 216. In response, the main DAC 212 outputs an analog voltage (for example, an X deflection signal) on path 218.

A pair of secondary DACs 220, 222 are shown in FIG. 8 to be provided in conjunction with the main DAC 212. These secondary DACs 220, 222 are denoted as DAC+ and DAC- and serve as reference (rail) voltage sources for the main DAC 212. In some embodiments, the internal construction of each of the DACs 212, 220 and 222 can be identical, including identical resolution and output range capabilities.

The DAC+ 220 is shown to receive a multi-bit digital value (VREF+) via path 224, and a once-per-rev clock signal on path 226. The VREF+ digital value on path 224 will be a digital expression of a desired VREF+ analog reference voltage for the main DAC 212. In similar fashion, the DAC- 222 receives a multi-bit digital value (VREF-) on path 228 and the once-per-rev clock signal on path 230. The VREF- digital value will provide a digital expression of a corresponding VREF- analog reference voltage for use by the main DAC 212.

Operation of the circuit 210 of FIG. 8 can be carried out as follows. Assume for purposes of the present discussion that the main DAC 212 is a 16-bit DAC which provides 65,535 ($2^{16}$) steps over a range of from 0-1V. Further assume that an EBR (such as the EBR 150 in FIG. 3) associated with the circuit 210 has a response of 1 nm/V (i.e., $1\times10^{-9}$ m of mechanical deflection per volt), and a first track is to be written with a recorded track pitch of 1.0000 μm.

Figure 9:
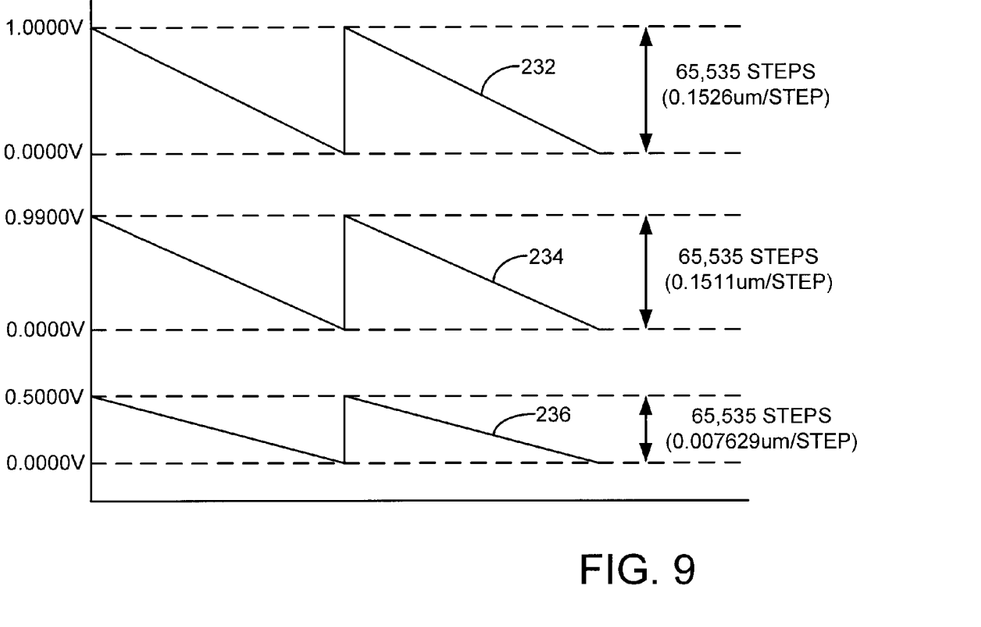
FIG. 9 represents analog voltage signals with different ranges corresponding to different track pitches on a rotatable medium.

In this case, the first track may require a deflection signal over a range of from 0V to 1.0000V. The DAC+ 220 would be configured to supply an analog VREF+ voltage of 1.0000V to the main DAC 212, and the DAC- 222 would supply an analog VREF- voltage of 0.0000V to the main DAC 212. The sawtooth deflection signal would thus be generated over each rotation with a resolution of 65,535 steps from 0.0000V to 1.0000V with 0.01526 μm per step, and the maximum X axis deflection range would be 1.0000 μm. An exemplary waveform having these characteristics is depicted in FIG. 9 at 232.

Next, assume that a subsequent rotation requires a reduced track pitch TP value that is 1% less than the first value, or about 0.9900 μm. This subsequent rotation may be for a second track adjacent the first track, or may be a subsequent rotation during a multi-rotational writing operation for the first track. The DAC+ 220 would be configured to supply an analog VREF+ voltage of 0.9900V to the main DAC 212, and the DAC- 222 would continue to supply an analog VREF- voltage of 0.0000V to the main DAC 212. The main DAC 212 would continue to utilize all 65,535 steps, but over a reduced range of from 0V to 0.9900V. Each step size would thus now be about 0.01511 μm, as shown for waveform 234 in FIG. 9.

If over a number of subsequent revolutions the TP is continually reduced, a point may be reached where the DAC+ 220 will supply an analog VREF+ reference that is significantly less than the initial reference level, such as a voltage of 0.5000V. The main DAC 212 will still retain a full resolution of 65,535 steps in the output waveform, but each of the steps will correspond to a reduced mechanical deflection of about 0.007629 μm. This is generally illustrated by waveform 236 in FIG. 9.

The circuit 210 of FIG. 8 thus precisely adjusts the respective VREF+ and VREF- reference voltages to a range that corresponds to the full voltage range of the deflection signal for a given rotation. This allows the full resolution capability of the DAC to be maintained irrespective of deflection range, and reduces the occurrence and magnitude of position errors in the writing of the data to the medium.

In some embodiments, an initial examination may be made of the respective TP values for the various tracks to be written, and the maximum reference voltage range can be assigned to tracks having the maximum TP value. For example, the waveform 232 in FIG. 9 can be used rotations associated with the largest amount of mechanical deflection (such as intermediary track T4 in FIG. 2). Rotations with smaller TP values can then be provided with derated reference voltage ranges in relation to the differences in TP values, such as provided by the derated waveforms 234 and 236 in FIG. 9.

Figure 10:
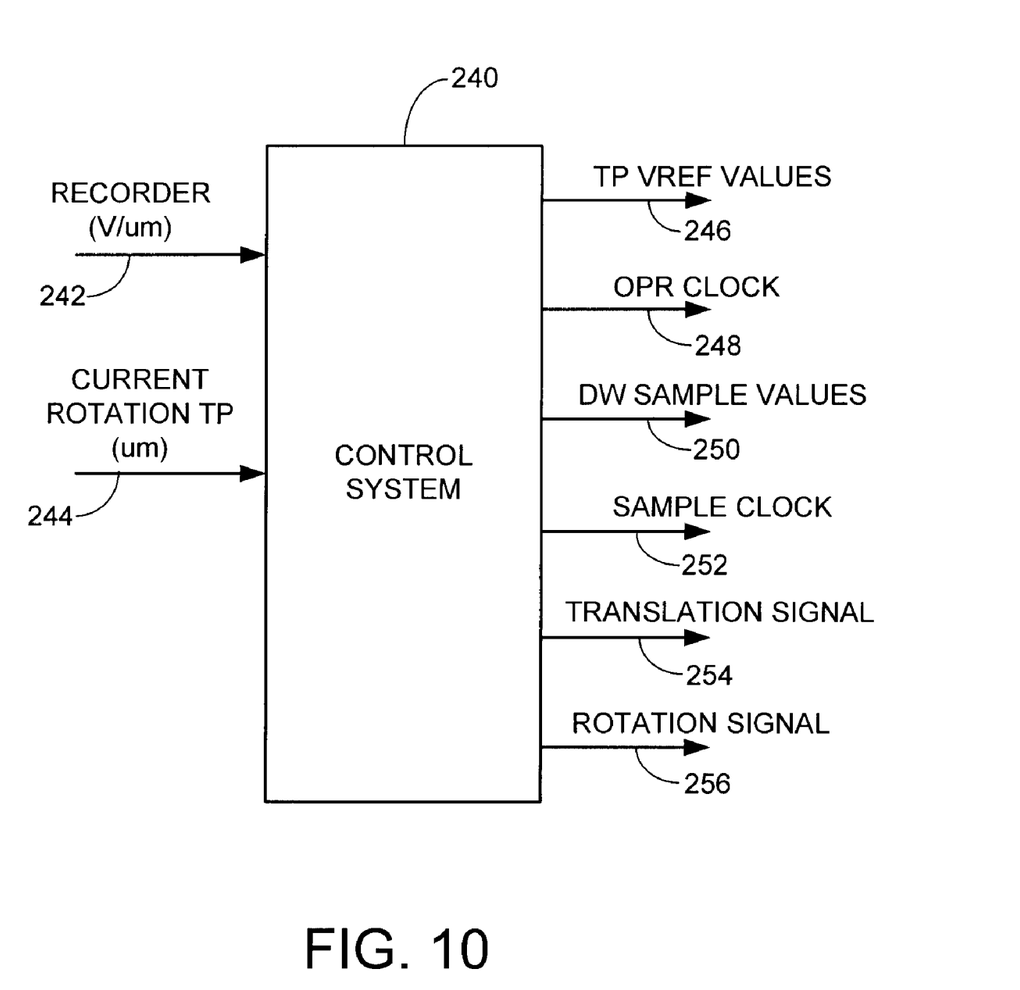
FIG. 10 is a control system configured in accordance with some embodiments.

FIG. 10 provides a functional block diagram of a deflection control system 240 that can be utilized in conjunction with the DAC circuitry 210 of FIG. 8 accordance with various embodiments. It is contemplated that the control system 240 of FIG. 9 and the DAC circuitry 210 of FIG. 8 can be incorporated into an EBR system such as 150 in FIG. 3.

The control system 240 in FIG. 10 receives a number of inputs, such as a recorder resolution value (such as in volts per distance, V/μm) on path 242 and a current rotation track pitch (TP) measure, such as in μm, on path 244. In response, the control system 240 generates a number of output control signals, including digitally expressed multi-bit VREF+ and VREF- values (TP VREF values) on combined path 246 for utilization by the respective secondary DACs 220, 222 in FIG. 8. A once-per-rev (OPR) clock signal is shown on path 246 also for use by these DACs 220, 222 as discussed above.

The control system 240 also generates the main DAC deflection waveform (DW) sample values on path 248, and the main DAC waveform sample clock on path 250. Translation signals and rotation signals can further be supplied on paths 252, 254.

While the various embodiments discussed above have been directed to X axis deflection signals using a generally sawtooth shaped waveform, it will be appreciated that the disclosed circuitry can readily be adapted for a number of different applications and waveform shapes, including applications not necessarily associated with the writing of data to a rotatable medium.

Moreover, while the exemplary circuitry of FIG. 8 shows the use of two secondary DACs 220, 222 to provide each of the respective VREF+ and VREF− values, it will be appreciated that this is not necessarily required. In some alternative embodiments, one of the secondary DACs can be eliminated as unnecessary. For example, the DAC− 222 could be eliminated and replaced with a hard connection to a reference plane (e.g., ground), voltage regulator, or some other circuit to supply the VREF− voltage. This would be useful in situations where the lower reference voltage value does not vary but is maintained at a constant level. In this way, adjustments to the applied reference voltage range (either higher or lower) would be effected solely by changing the multi-bit input value (VREF+ value) to the remaining DAC+ 220. Similar arrangements could be made to eliminate the DAC+ 220 circuitry and rely on changes solely to the lower reference voltage VREF−.

It will further be appreciated that the two secondary DACs 220, 222 shown in FIG. 8 can be adjusted to provide any respective values and ranges as required. For example, the VREF− value could be set to any non-zero value, such as +2.5V, −1.0V, etc. depending on the desired magnitude and range of the output analog signal from the main DAC 212.

It will now be appreciated that the various embodiments of the present invention can provide a number of benefits. Controllably adjusting the overall reference voltage range allows the full DAC resolution to be maintained in situations where the magnitude of the output analog voltage changes over time, such as in the case where different magnitudes of deflection signals are required as described herein. While an electron write beam has been disclosed for purposes of providing a particular embodiment, it will be appreciated that any number of different types of write beams, including but not limited to laser or magnetic write beams, can be used as desired.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a first digital to analog converter (DAC) configured to output a deflection signal having an analog voltage level corresponding to a magnitude of a first multi-bit digital input value applied to the first DAC;
    a second DAC configured to supply an analog reference voltage to the first DAC having an analog voltage level corresponding to a magnitude of a second multi-bit digital input value applied to the second DAC; and
    a write beam generator which generates a write beam, wherein the write beam is deflected by the deflection signal.

2. The apparatus of claim 1, wherein the analog reference voltage is characterized as a first reference voltage, and wherein the apparatus further comprises a third DAC configured to supply a second analog reference voltage to the first DAC having an analog voltage level corresponding to a magnitude of a third multi-bit digital input value applied to the third DAC.

3. The apparatus of claim 2, wherein the first reference voltage comprises a VREF+ rail voltage and the second reference voltage comprises a VREF− rail voltage so that the output analog voltage signal has a magnitude range within a range defined by VREF− to VREF+, the VREF+ voltage established by the second multi-bit digitally digital input value and the VREF− voltage established by the third multi-bit digital input value.

4. The apparatus of claim 1, wherein the deflection signal is used to deflect the write beam from the write beam generator as the write beam writes data to a rotatable storage medium over a sequence of revolutions of said medium.

5. The apparatus of claim 4, wherein a first reference voltage is applied by the second DAC to the first DAC for a first revolution of said medium corresponding to a first track pitch (TP), and a different, second reference voltage is applied by the second DAC to the first DAC for a second revolution of said medium corresponding to a different, second TP.

6. The apparatus of claim 1, in which the analog deflection signal is characterized as a repeating saw-tooth signal that varies in relation to changes in the first and second digital input values.

7. The apparatus of claim 1, in which the analog reference voltage supplied by the second DAC to the first DAC is adjusted in relation to variations in track pitch of a data storage medium to which data are written by the write beam.

8. The apparatus of claim 1, in which the write beam writes data to a rotatable storage medium in the form of concentric tracks having a variable track pitch (TP), and the reference voltage applied to the first DAC by the second DAC is adjusted in relation to said TP.

9. The apparatus of claim 8, in which the writer beam writes data to the rotatable storage medium along a first translation geometry to emulate a different, second translation geometry of a reader system adapted to subsequently read data from said medium.

10. An apparatus comprising a writer system used to write data to a storage medium in the form of a plurality of concentric tracks, the writer system comprising a motor which controllably rotates the storage medium, a write beam generator which generates a write beam to impinge the storage medium to write data thereto, and a deflection control system adapted to repetitively deflect the write beam over each revolution of the storage medium, the deflection control system comprising a first digital to analog converter (DAC) configured to output an analog deflection signal having an analog voltage level corresponding to a magnitude of a first multi-bit digital input value applied to the first DAC, and a second DAC configured to supply an analog rail voltage to the first DAC having an analog voltage level corresponding to a magnitude of a second multi-bit digital input value applied to the second DAC.

11. The apparatus of claim 10, in which the concentric tracks are written to the medium having a track pitch (TP) that varies with radius, and the reference voltage applied to the first DAC by the second DAC is adjusted in relation to said variable TP.

12. The apparatus of claim 10, in which the writer system writes data to the rotatable storage medium along a first translation geometry to emulate a different, second translation geometry of a reader system adapted to subsequently read data from said medium.

13. A storage medium having data written thereto by the writer system of claim 10.

14. A method comprising:
    providing a first digital to analog converter (DAC) coupled to a second DAC, the second DAC adapted to supply a rail voltage to the first DAC;

generating a deflection signal as an output analog voltage from the first DAC responsive to a first multi-bit digital input value applied to the first DAC and a second multi-bit digital input value applied to the second DAC; and using the deflection signal to deflect a write beam from a write beam generator.

15. The method of claim 14, wherein the write beam impinges a rotatable medium to write data thereto over a sequence of revolutions of said medium.

16. The method of claim 15, wherein a first rail voltage is applied by the second DAC to the first DAC for a first revolution of said medium corresponding to a first track pitch (TP), and a different, second rail voltage is applied by the second DAC to the first DAC for a second revolution of said medium corresponding to a different, second TP.

17. The method of claim 14, wherein the generating step comprises adjusting the rail voltage supplied by the second DAC to the first DAC to a different magnitude for each of a plurality of successive rotations of a data storage medium impinged by said write beam.

18. The method of claim 14, wherein the write beam writes data to a rotatable storage medium in the form of concentric tracks having a variable track pitch (TP), wherein the rail voltage supplied by the second DAC is adjusted to a different value for each of a succession of adjacent tracks written to the medium in relation to differences in TP of said tracks.

19. The method of claim 14, wherein the first DAC is adapted to output a maximum number of steps in the output deflection signal responsive to a total number of bits in said first multi-bit digital input value, and wherein the rail voltage of the second DAC is adjusted to maintain said maximum number of steps in the deflection signal over each revolution of a storage medium impinged by the write beam.

20. A data storage medium having data written thereto in accordance with the method of claim 14.

* * * * *